US010003969B2

(12) United States Patent
Gargiulo (10) Patent No.: US 10,003,969 B2
(45) Date of Patent: Jun. 19, 2018

(54) COMMUNICATION BETWEEN MOBILE DEVICES AND MOBILE WALLET ARCHITECTURES (71) Applicant: GOOGLE INC., Mountain View, CA (US)

(72) Inventor: Michael J. Gargiulo, Corinth, TX (US)

(73) Assignee: GOOGLE LLC, Mountain View, CA (US)

(*) Notice: Subject to any disclaimer, the term of this patent is extended or adjusted under 35 U.S.C. 154(b) by 0 days. days.

(21) Appl. No.: 14/564,552

(22) Filed: Dec. 9, 2014

(65) Prior Publication Data
US 2015/0181418 A1 Jun. 25, 2015

Related U.S. Application Data (60) Provisional application No. 61/918,169, filed on Dec. 19, 2013.

(51) Int. Cl.
H04W 4/24 (2018.01)
H04W 12/06 (2009.01)
(Continued)

(52) U.S. Cl.
CPC ............ *H04W 12/06* (2013.01); *G06Q 20/02* (2013.01); *G06Q 20/327* (2013.01); *G06Q 20/36* (2013.01);
(Continued)

(58) Field of Classification Search
CPC ........ G06Q 20/02; G06Q 20/36; H04W 12/06
See application file for complete search history.

(56) References Cited

U.S. PATENT DOCUMENTS 5,590,038 A 12/1996 Pitroda .......................... 395/241
5,640,002 A 6/1997 Ruppert et al. ................ 235/472
(Continued)

FOREIGN PATENT DOCUMENTS

CA 2 381 614 A1 3/2001
EP 1 222 503 A2 7/2002
(Continued)

OTHER PUBLICATIONS

PCT/US2014/069271, "International Search Report and Written Opinion received for PCT Patent Application No. PCT/US2014/069271, dated Mar. 13, 2015,", 8 pages.
(Continued)

*Primary Examiner* — Lester G Kincaid
*Assistant Examiner* — Daniel G. Bassett
(74) *Attorney, Agent, or Firm* — Johnson, Marcou & Isaacs, LLC (57) ABSTRACT Systems, methods and computer program products are provided for obtaining mobile device data. A first request for mobile device data is received over a communications network. The first request includes a first identifier associated with a mobile device. A first mobile network operator (MNO) system corresponding to the mobile device is identified from a plurality of MNO systems using the first identifier. A second request is transmitted to the first MNO system. The second request includes the first identifier. A response is received from the first MNO system. The response includes the mobile device data. The mobile device data and the first identifier are transmitted to a server.

15 Claims, 4 Drawing Sheets (51) Int. Cl.
  *H04M 15/06*  (2006.01)
  *G06Q 20/02*  (2012.01)
  *G06Q 20/36*  (2012.01)
  *H04M 15/00*  (2006.01)
  *G06Q 20/32*  (2012.01)

(52) U.S. Cl.
  CPC .......... *H04M 15/06* (2013.01); *H04M 15/62* (2013.01); *H04W 4/24* (2013.01)

(56) References Cited

U.S. PATENT DOCUMENTS

| | | | |
|---|---|---|---|
| 5,748,740 A | 5/1998 | Curry et al. | 380/25 |
| 5,805,702 A | 9/1998 | Curry et al. | 380/24 |
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,131,645 B2 | 3/2012 | Lin et al. | 705/51 |
| 8,140,418 B1 | 3/2012 | Casey et al. | 705/35 |
| 8,396,808 B2 | 3/2013 | Greenspan | 705/64 |
| 8,423,462 B1 | 4/2013 | Amacker et al. | |
| 8,429,046 B2 | 4/2013 | Pitroda | 705/35 |
| 2002/0049631 A1 | 4/2002 | Williams | 705/14 |
| 2002/0082921 A1 | 6/2002 | Rankin | 705/14 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0200489 A1 | 10/2003 | Hars | 714/703 |
| 2004/0073519 A1 | 4/2004 | Fast | 705/65 |
| 2004/0186768 A1 | 9/2004 | Wakim et al. | 705/14 |
| 2005/0004866 A1 | 1/2005 | Bonalle et al. | 705/39 |
| 2005/0171898 A1 | 8/2005 | Bishop et al. | 705/39 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2006/0265339 A1* | 11/2006 | Vakil | G06Q 20/02 705/76 |
| 2006/0287004 A1 | 12/2006 | Fuqua | 455/558 |
| 2007/0014407 A1 | 1/2007 | Narenda et al. | 380/259 |
| 2007/0014408 A1 | 1/2007 | Narenda et al. | 380/270 |
| 2007/0198432 A1 | 8/2007 | Pitroda et al. | 705/64 |
| 2008/0306849 A1 | 12/2008 | Johnson, Jr. et al. | 705/35 |
| 2009/0108064 A1 | 4/2009 | Fernandes et al. | 235/380 |
| 2009/0164322 A1 | 6/2009 | Khan et al. | 705/14 |
| 2010/0241494 A1 | 9/2010 | Kumar et al. | 705/14.1 |
| 2011/0073663 A1 | 3/2011 | Narendra et al. | 235/492 |
| 2011/0171996 A1 | 7/2011 | Narendra et al. | 455/558 |
| 2011/0223972 A1 | 9/2011 | Narendra et al. | 455/558 |
| 2011/0231238 A1 | 9/2011 | Khan et al. | 705/14.26 |
| 2011/0244796 A1 | 10/2011 | Khan et al. | 455/41.1 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2012/0064828 A1 | 3/2012 | Khan et al. | 455/41.1 |
| 2012/0109764 A1 | 5/2012 | Martin et al. | 705/17 |
| 2012/0265684 A1* | 10/2012 | Singh | G06Q 20/027 705/44 |
| 2012/0323664 A1 | 12/2012 | Klems | 705/14.26 |
| 2013/0111599 A1 | 5/2013 | Gargiulo et al. | |
| 2013/0218769 A1* | 8/2013 | Pourfallah | G06Q 20/10 705/44 |
| 2013/0260734 A1 | 10/2013 | Jain et al. | |
| 2013/0262302 A1 | 10/2013 | Lettow et al. | |
| 2014/0068722 A1* | 3/2014 | Hayat | H04W 12/08 726/4 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| KR | 10-2013-0116905 A | 10/2013 |
| WO | WO 01/18629 A3 | 3/2001 |
| WO | WO 03/012717 A1 | 2/2003 |
| WO | 2012091349 A2 | 7/2012 |
| WO | 2015094808 A1 | 6/2015 |

OTHER PUBLICATIONS

U.S. Appl. No. 14/508,304, filed Oct. 7, 2014.
Pastore, "Extended European Search Report issued in European Application No. 14872331.5", dated Mar. 30, 2017, 7 pages.
NA, "Korean Office Action issued in Korean Application No. 10-2016-7016719", dated Mar. 22, 2017, 6 pages of English Translation and 5 pages of Korean Office Action.
Baharlou, "International Preliminary Report on Patentability issued in International Application No. PCT/US2014/069271", dated Jun. 30, 2016, 7 pages.

* cited by examiner

COMMUNICATION BETWEEN MOBILE DEVICES AND MOBILE WALLET ARCHITECTURES

CROSS REFERENCE TO RELATED APPLICATION

This application claims priority to U.S. Provisional Patent Application No. 61/918,169, filed Dec. 19, 2013, the entire contents of which are incorporated herein by reference.

BACKGROUND

Field

The present invention relates generally to systems, methods, and computer program products for obtaining mobile device data.

Related Art

In a mobile commerce environment, mobile devices typically include mobile wallet applications for storing and managing data. Mobile wallet applications are also used to manage inbound and outbound communications to and from mobile devices, for performing a variety of processes such as activating other applications, resolving hardware and software changes, and provisioning accounts. Such communications to and from the mobile wallet applications on the mobile devices are directed to and received from a number of systems internal and external to a mobile wallet provider architecture.

A mobile wallet provider is a company, organization, entity, or the like, that provides services such as contactless transactions (e.g., payments, commerce, venue admissions, transit ticketing). A mobile wallet provider architecture includes a number of systems for facilitating such transactions. Systems within a mobile wallet provider architecture may include servers, enterprise service buses (ESBs), trusted service managers (TSMs), and the like.

A mobile wallet provider also communicates with systems outside of the mobile wallet provider architecture in order to provide its services. Such systems may include service provider (SP) systems, mobile network operator (systems), merchant systems, point of sale (POS) terminals, and the like.

To ensure that communications to and from mobile wallet applications on mobile devices are successfully sent and received, systems involved in such communications need to know, have access to and/or store mobile device data such as mobile device numbers (MDNs) associated with the mobile devices.

Typically, mobile device data is obtained by requesting and/or receiving such data from the mobile device. That is, the mobile device prompts its user to input the mobile device data or retrieves the mobile device data from its memory and, in turn, transmits that data to the requesting and/or target system. The mobile device data is transmitted from the mobile device to the requesting and/or target system using mobile-originated (e.g., mobile device-originated) messages (e.g., short message service (SMS) messages) transmitted over mobile (e.g., wireless) communications networks.

Effective and efficient transmission of mobile device data using this type of messaging and mobile communications networks depends on a variety of mobile communications networks and their providers. Mobile communications networks may be affected by outages, and inefficient and/or ineffective service, which may result in data loss, delays and the like. Failure to securely and reliably obtain mobile device data may result in failed execution of processes, redundant execution of processes, and the like.

Given the foregoing, it would be beneficial to provide systems with mobile device data for communicating with mobile devices using an alternative communication mechanism and infrastructure.

BRIEF DESCRIPTION

The example embodiments presented herein meet the above-identified needs by providing systems, methods, and computer program products for obtaining mobile device data.

In one example embodiment, a system is provided for obtaining mobile device data. The system includes at least one memory and a processor coupled to the at least one memory. A first request for mobile device data is received over a communications network. The first request includes a first identifier associated with a mobile device. A first mobile network operator (MNO) system corresponding to the mobile device is identified from a plurality of MNO systems using the first identifier. A second request is transmitted to the first MNO system. The second request includes the first identifier. A response is received from the first MNO system. The response includes the mobile device data. The mobile device data and the first identifier are transmitted to a server.

In another example embodiment, a method for obtaining mobile device data, comprising steps of: receiving, over a communications network, a first request for mobile device data, the first request including a first identifier associated with a mobile device; identifying, from a plurality of mobile network operator (MNO) systems, a first MNO system corresponding to the mobile device, using the first identifier; transmitting a second request to the first MNO system, the second request including the first identifier; receiving a response from the first MNO system, the response including the mobile device data; and transmitting the mobile device data and the first identifier to a server.

In yet another example embodiment, a non-transitory computer-readable medium has stored thereon sequences of instructions, which when executed by a computer, cause the computer to: receive, over a communications network, a first request for mobile device data, the first request including a first identifier associated with a mobile device; identify, from a plurality of mobile network operator (MNO) systems, a first MNO system corresponding to the mobile device, using the first identifier; transmit a second request to the first MNO system, the second request including the first identifier; receive a response from the first MNO system, the response including the mobile device data; and transmit the mobile device data and the first identifier to a server.

BRIEF DESCRIPTION OF THE DRAWINGS

The features and advantages of the example embodiments presented herein will become more apparent from the detailed description set forth below when taken in conjunction with the following drawings.

DETAILED DESCRIPTION

I. Overview

The example embodiments presented herein are directed to systems, methods, and computer program products for obtaining mobile device data, which are described herein in terms of a mobile wallet application activation process. This description is not intended to limit the application of the example embodiments presented herein. In fact, after reading the following description, it will be apparent to one skilled in the relevant art(s) how to implement the following example embodiments in alternative processes such as the management of hardware and/or software changes, provisioning of applications, installation of applications, and the like.

II. System

Figure 1:
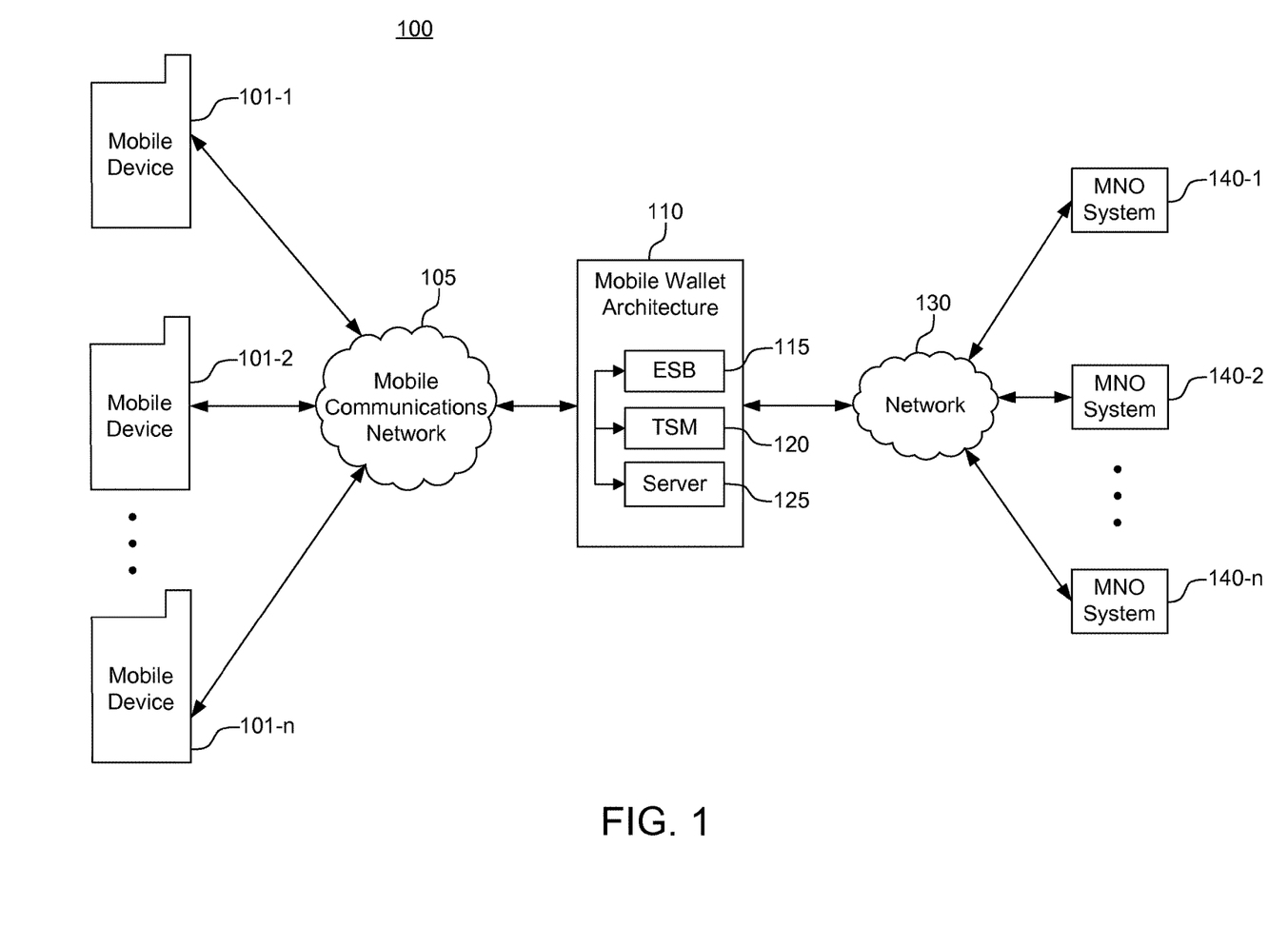
FIG. 1 is a diagram of a system for obtaining mobile device data according to an exemplary embodiment.

FIG. 1 is a diagram of a system 100 for obtaining mobile device data according to an exemplary embodiment. As shown in FIG. 1, system 100 includes mobile devices 101-1, 101-2, ..., 101-n (collectively "101" or "mobile device(s) 101"), which are connected to a mobile wallet architecture 110 via a mobile communications network 105.

Mobile devices 101 may be, for example, a cellular phone, tablet or the like. Although not illustrated in FIG. 1, each mobile device 101 includes a processor, memory, contactless frontend (CLF), baseband modem, and user interface such as a display screen. A baseband modem is a digital modem that is used for mobile network communications. A CLF is circuitry which handles the analog aspect of contactless or near field communications (NFC) and the communication protocol layers of a contactless transmission link. A CLF also is used to exchange data with point of sale (POS) terminals, contactless readers, and other systems and/or devices. Mobile devices 101 may also include or have associated therewith a secure element (SE), which may be implemented as a Universal Integrated Circuit Card (UICC), embedded SE card, secure micro secure digital (microSD) card, and the like. A secure element may also be implemented as a virtual system, such as a cloud-based architecture or host card emulation (HCE) environment.

Mobile devices 101 each include, store and/or are associated with attributes such as a device identifier (ID), SE ID, mobile subscriber integrated services digital network-number (MSISDN) (hereinafter referred to as a "mobile device number" or "MDN"), mobile network operator (MNO) ID, and/or subscriber identity module (SIM) ID. A device ID may be an international mobile equipment identity (IMEI), a mobile equipment identifier (MEID), a Media Access Control (MAC) address, or a similar unique serial number associated with hardware of a mobile device. An SE ID may be a card image number (CIN), which is a unique number associated with a secure element. An MDN may be a phone number associated with a mobile device line of service, which is associated with a user and/or a mobile device. An MNO ID is a unique number corresponding to an MNO (also referred to as wireless network carriers) associated with a mobile device. A SIM ID may be an integrated circuit card ID (ICCID) or an international mobile subscriber identity (IMSI), depending on the type of mobile device.

Mobile devices 101 include or have stored in their memory, respective mobile wallet applications which include instructions that when executed by the processor of the corresponding mobile devices 101, cause the mobile devices to act as instruments, for example, for processing contactless transactions. Each mobile wallet application is associated with a corresponding mobile wallet identifier (WID).

Mobile communications network 105, over which mobile devices 101 are connected to mobile wallet architecture 110, may be a cellular network, radio network, wireless network, mobile network or the like. Mobile devices 101 may communicate with mobile wallet architecture 110 using over-the-air (OTA) technology, secure channel protocol, secure sockets layer (SSL), transport layer security (TLS), or the like.

Mobile wallet architecture 110 may include one or more systems and/or devices managed by a mobile wallet provider, for example, for providing contactless transaction functionality. For example, mobile wallet architecture 110 may include an enterprise service bus (ESB) 115, trusted service manager (TSM) 120 and server 125. It should be understood that ESB 115, TSM 120 and server 125 may be implemented either as separate systems, or as a single system. ESB 115, TSM 120 and server 125 may include a processor and memory, and may be communicatively coupled with each other.

ESB 115 is a system for managing predetermined types of communications to and from external systems, such as MNO systems 140-1, 140-2, ..., 140-n (collectively "140" or "MNO system(s) 140"). In one example embodiment, ESB 115 may be hardware and/or software that provides interfaces for receiving and transmitting data, for example, to and from MNO systems 140.

TSM 120 is a system for managing predetermined types of communications to and from systems and devices. In one example embodiment, TSM 120 may be hardware and/or software that provides interfaces for receiving and transmitting data, for example, to and from ESB 115, MNO systems 140, mobile devices 101, and the secure elements associated with mobile devices 101.

Server 125 (also known as a "wallet server" or "mobile wallet server") is hardware and/or software for storing data associated with, for example, mobile devices, MNOs, mobile wallet applications, secure elements, and the like. In one example embodiment, server 125 stores mobile wallet application profiles, which may include mobile device, user, mobile wallet application and transaction data. Server 125 may receive and respond to requests for stored data from other systems such as ESB 115 and TSM 120.

MNO systems 140 are connected to mobile wallet architecture 110 (and/or each of the systems included in mobile wallet architecture 110) over a network 130. Network 130 may be a mobile communications network, virtual private network (VPN), or the like. MNO systems 140 are stand-alone or multi-device systems operated by mobile network operators. In one example embodiment, MNO systems 140 include a processor and memory. MNO systems 140 may store associated mobile device information, such as account information, MDN, and the like. In one example embodiment, MNO systems 140 may receive and respond to requests for data, such as requests for an MDN associated with a mobile device.

The systems and/or devices illustrated in system 100 are explained in further detail below with reference to FIGS. 2-4.

III. Process

Figure 2:
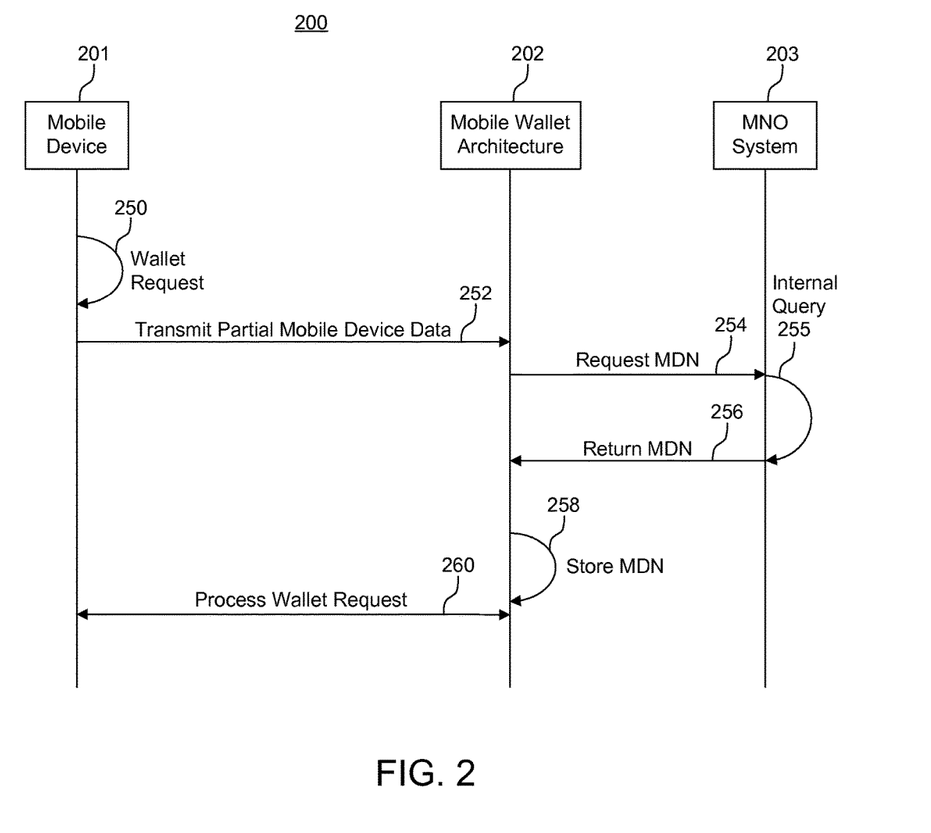
FIG. 2 is a sequence diagram for obtaining mobile device data according to an exemplary embodiment.

FIG. 2 is a sequence diagram 200 for obtaining mobile device data according to an exemplary embodiment. More specifically, in FIG. 2, mobile wallet architecture 202 (e.g., FIG. 1, mobile wallet architecture 110) obtains an MDN associated with a mobile device 201 (e.g., FIG. 1, mobile device 101-1) from an MNO system 203 (e.g., FIG. 1, MNO system 140-1). Although not illustrated in FIG. 2, it should be understood that mobile wallet architecture 202 may include one or more of an ESB (e.g., FIG. 1, ESB 115), TSM (e.g., FIG. 1, TSM 120), and server (e.g., FIG. 1, server 125).

An MDN is obtained by the mobile wallet architecture 202, for example, in order to establish a secure and reliable connection between the mobile device 201 (e.g., its associated secure element) and the mobile wallet architecture 202 (e.g., its associated TSM). The established connection can be used, for example, to transmit and receive information used to activate a mobile wallet application on the mobile device.

In FIG. 2, at step 250, a wallet request is input into the mobile device 201. In an example embodiment, the wallet request is a request to activate a mobile wallet application on the mobile device 201. The wallet request is received, for example, via an input into the interface of the mobile device 201. In turn, at step 252, the mobile device 201 transmits partial mobile device data to the mobile wallet architecture 202. The partial mobile device data includes an identifier corresponding to the mobile device 201 (or its secure element), such as a SIM ID (e.g., ICCID) or SE ID associated with the SIM card or secure element, respectively.

In turn, at step 254, the mobile wallet architecture 202 transmits a request for an MDN to the MNO system 203. The request for an MDN includes the identifier corresponding to the mobile device 201 (e.g., a SIM ID such as an ICCID), which was transmitted at step 252. The request for an MDN may also include additional mobile device or mobile wallet application information such as a mobile device ID, MNO ID, WID, and/or the like. The request for an MDN transmitted at step 254 is routed to the MNO system associated with the mobile device 201 (in this case, MNO system 203), based on information received at step 252, or based on pre-stored data associated with the mobile device 201. For example, the mobile wallet architecture 202 may identify MNO system 203 as the proper target MNO system based on the SIM ID, MNO ID, and the like.

In turn, the MNO system 203 performs an internal query 255 to retrieve the MDN associated with mobile device 201, based on the information received in the request for an MDN transmitted at step 254. At step 256, the MNO system 203 transmits the retrieved MDN to the mobile wallet architecture 202. The mobile wallet architecture 202 stores, at step 258, the received MDN in association with the mobile device 201. That is, the MDN and, for example, SIM ID of the mobile device 201 may be associatively stored by the mobile wallet architecture 202. In one example embodiment, an aggregation and/or association of data, referred to as a "profile" is created and stored by the mobile wallet architecture based on information received by and/or available to the mobile wallet architecture. The profile may be, for example, an association of the WID, SIM ID, SE ID, MDN, and/or the like. That data may also be associated with a profile identifier corresponding to that particular grouping of information.

At step 260, the request initiated at step 250 is resumed and processed via communications between the mobile wallet architecture 202 and the mobile device 201. That is, the mobile wallet architecture 202, having obtained an accurate and MNO-verified MDN associated with the mobile device 201, can securely process a request (e.g., mobile wallet application activation request) by, among other actions, communicating with the mobile device 201.

Figure 3:
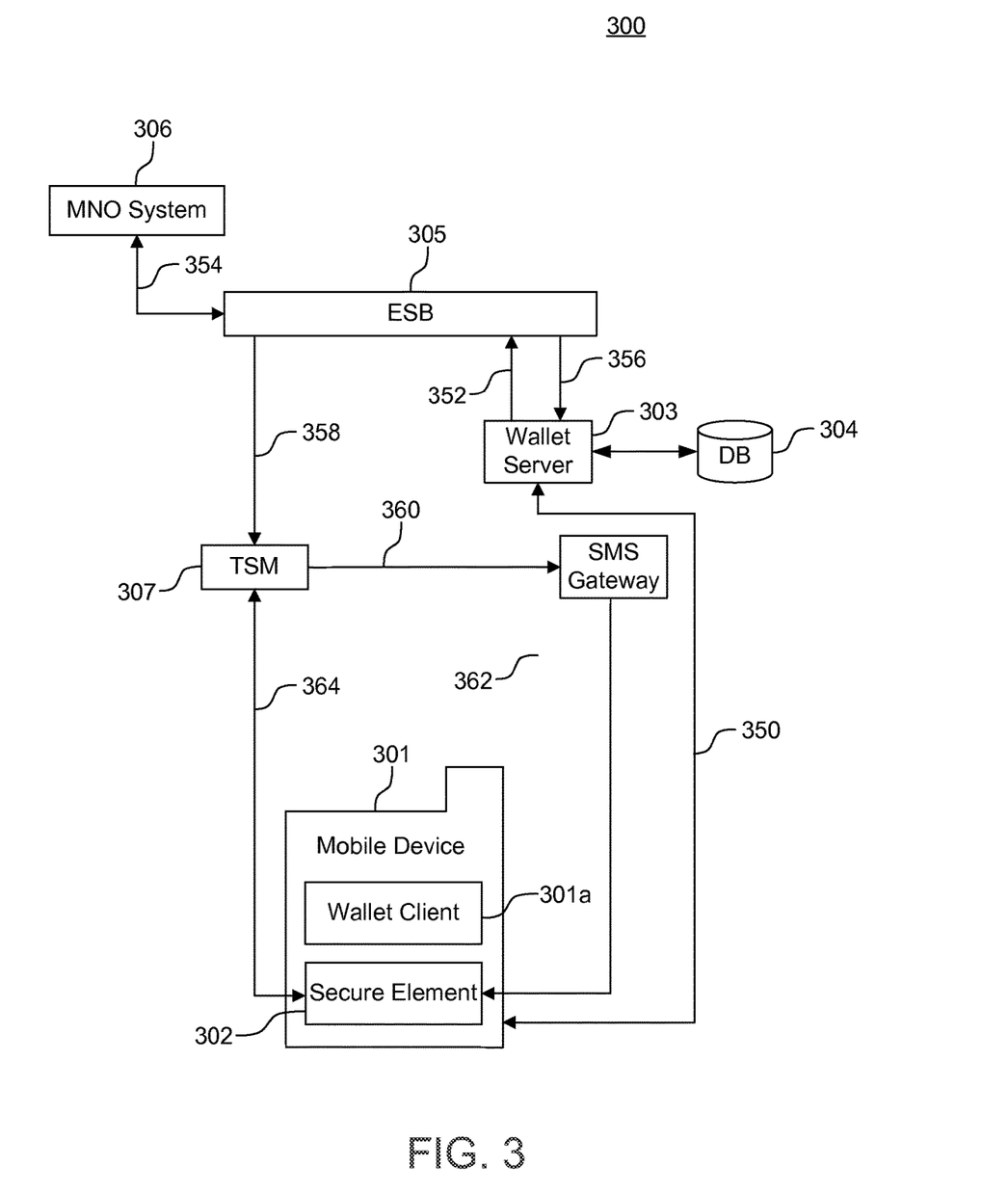
FIG. 3 is a system flow diagram for obtaining mobile device data according to an exemplary embodiment.

FIG. 3 is a system flow diagram 300 for obtaining mobile device data according to an exemplary embodiment. In FIG. 3, a mobile device 301 (e.g., FIG. 1, mobile device 101-1) initiates a process such as an activation request, for example, in response to a prompt received via a user interface of the mobile device. In one example embodiment, the activation request is a request to activate a mobile wallet application 301a stored on the memory of the mobile device 301.

In turn, at step 350, the mobile device 301 transmits mobile device information to a wallet server 303 (e.g., FIG. 1, server 125) over a secure network connection (e.g., FIG. 1, mobile communications network 105). The mobile device information transmitted at step 350 includes an identifier (e.g., a SIM ID or SE ID) associated with the mobile device 301. The wallet server 303 includes a wallet database 304, which may be used by the wallet server 303 to store and manage information associated with mobile wallet applications, mobile devices and the like.

At step 352, the wallet server transmits a request to an ESB 305 (e.g., FIG. 1, ESB 115) to request and/or fetch the MDN associated with the mobile device 301. The request transmitted at step 352 may be a function, service or interface call, and may include mobile device information such as the SIM ID and/or SE ID associated with the mobile device 301.

In turn, the ESB 305 identifies the appropriate MNO system with which to communicate (i.e., the MNO system corresponding to mobile device 301). The ESB 305 may identify the proper MNO system based on mobile device information received from the wallet server, such as the SIM ID, SE ID and/or MNO ID corresponding to the mobile device 301. It should be understood that the proper MNO system may be identified and/or selected from a plurality of MNO systems (e.g., FIG. 1, MNO systems 101-1, 101-2, . . . , 101-n).

In turn, at step 354, the ESB 305 communicates with the MNO system 306 to receive the MDN associated with mobile device 301. That is, at step 354, the ESB 305 transmits an MDN request to the MNO system 306. The MDN request includes at least a portion of the information transmitted at step 350 to the wallet server or at step 352 to the ESB 305. In particular, the request transmitted at step 354 includes an identifier (e.g., a SIM ID or SE ID) associated with the mobile device 301. The MNO system 306 uses the mobile device information received from the ESB 305 and retrieves the MDN associated with the mobile device information. Still in step 354, the MNO system 306 transmits a message or response to the ESB 306, including the retrieved MDN associated with the mobile device 301.

It should be understood that a mobile device may be associated with more than one identifier. In an optional embodiment, more than one identifier is associated with the mobile device and used to retrieve an MDN associated with the mobile device information.

In one example embodiment, the message or response transmitted at step 354 may include information indicating whether the MDN retrieval requested by the ESB 306 succeeded or failed. Such information may be in the form of a code associated with a predetermined result. For example, a code may indicate that there was a failure caused by one or more of a service outage, non-existent MDN, lack of permissions, or unidentifiable target mobile device.

The ESB 305, upon receiving the MDN from the MNO system 306, transmits, at step 356, the MDN to the wallet server 303. The wallet server 303 stores the MDN received from the ESB 305 (e.g., the MDN corresponding to mobile device 301), for example, in wallet database 304. In one example embodiment, the MDN is stored in association with other information corresponding to the mobile device 301 (e.g., SIM ID, SE ID, MNO ID, WID).

In turn, the ESB 305 transmits, at step 358, a request to create a user profile to a TSM 307 (e.g., FIG. 1, TSM 120). The request to create a user profile may include at least a portion of the data stored by the wallet server 303 and/or wallet database 304 in association with the mobile device 301, including the MDN of the mobile device 301. The TSM 307 associatively stores the information corresponding to the mobile device 301.

The TSM 307, having received the MDN of the mobile device 301, can accurately and reliably route communications to the mobile device 301. For example, at step 360, the TSM 307 transmits a wakeup message request to short message service (SMS) gateway 308. The wakeup message may be, for example, a short message peer-to-peer (SMPP) communication. The SMS gateway 308 may be any type of gateway that allows communications between the TSM 307 and mobile device 301 (or SE 302, associated with mobile device 301). The SMS gateway 308 may be communicatively coupled or connected to a mobile network and operable to handle a variety of protocols including Hypertext Transfer Protocol (HTTP), Simple Mail Transfer Protocol (SMTP), SMPP, web services, and the like.

At step 362, the SMS gateway 308 transmits a binary SMS message to the mobile device 301, based on the wakeup message sent at step 360. The mobile device 301 routes the binary SMS message to its corresponding secure element 302.

In turn, at step 364, the secure element 302 and the TSM 307 establish a secure communications channel (e.g., bearer independent protocol (BIP) channel), over which data can securely be transmitted. The secure communications channel between the secure element 302 and the TSM 307 can be used to transmit, for example, application protocol data unit (APDU) commands and responses. In one example embodiment, APDUs and data can be directly exchanged between the TSM 307 and the secure element 302. APDUs can be used to, among other things, load, install, instantiate, and/or personalize applets on the secure element 302. The establishment of a secure communications channel between multiple systems and/or devices (e.g., TSM, secure element) is described in further detail in U.S. patent application Ser. No. 14/508,304, filed on Oct. 7, 2014 and titled "Systems, Methods, and Computer Program Products for Managing Communications," the contents of which are incorporated herein by reference in their entirety.

IV. Example Computer-Readable Implementation

The example embodiments described above such as, for example, the systems and procedures depicted in or discussed in connection with FIGS. 1-3 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 4:
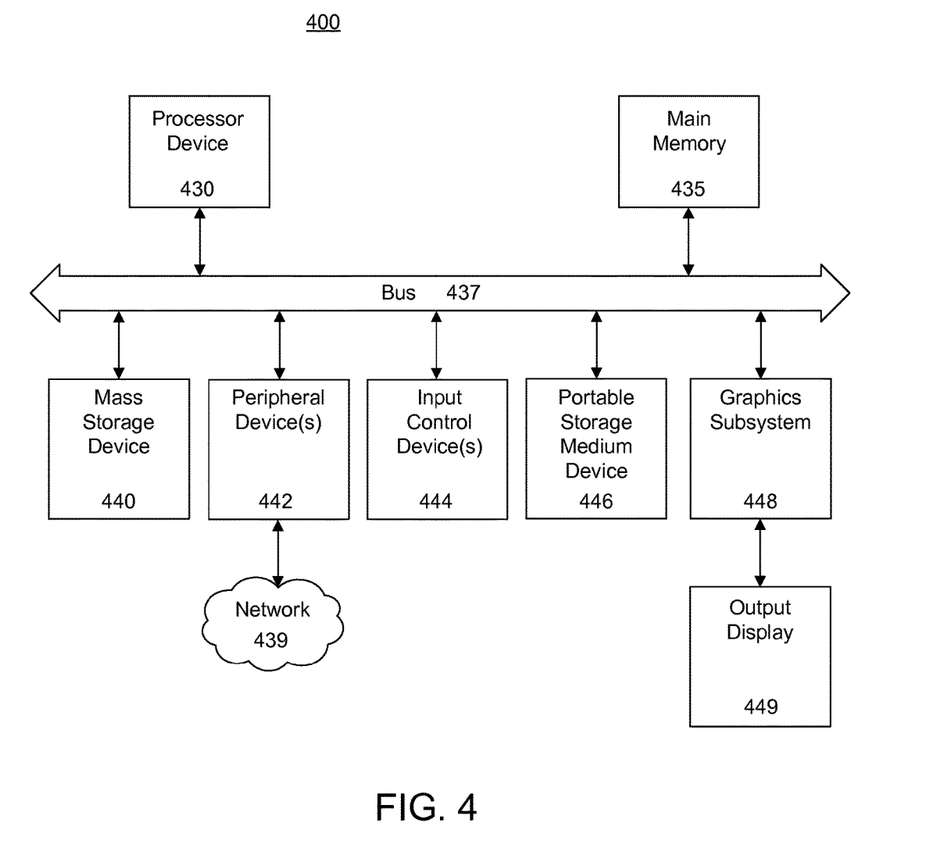
FIG. 4 is a block diagram of an exemplary system useful for implementing the present invention.

FIG. 4 is a block diagram of a general and/or special purpose computer 400, which may be a general and/or special purpose computing device, in accordance with some of the example embodiments of the invention. The computer 400 may be, for example, a user device, a user computer, a client computer and/or a server computer, among other things.

The computer 400 may include without limitation a processor device 430, a main memory 435, and an interconnect bus 437. The processor device 430 may include without limitation a single microprocessor, or may include a plurality of microprocessors for configuring the computer 400 as a multi-processor system. The main memory 435 stores, among other things, instructions and/or data for execution by the processor device 430. The main memory 435 may include banks of dynamic random access memory (DRAM), as well as cache memory.

The computer 400 may further include a mass storage device 440, peripheral device(s) 442, portable non-transitory storage medium device(s) 446, input control device(s) 444, a graphics subsystem 448, and/or an output display interface 449. For explanatory purposes, all components in the computer 400 are shown in FIG. 4 as being coupled via the bus 437. However, the computer 400 is not so limited. Devices of the computer 400 may be coupled via one or more data transport means. For example, the processor device 430 and/or the main memory 435 may be coupled via a local microprocessor bus. The mass storage device, 440, peripheral device(s) 442, portable storage medium device(s) 446, and/or graphics subsystem 448 may be coupled via one or more input/output (I/O) buses. The mass storage device 440 may be a nonvolatile storage device for storing data and/or instructions for use by the processor device 430. The mass storage device 440 may be implemented, for example, with a magnetic disk drive or an optical disk drive. In a software embodiment, the mass storage device 440 is configured for loading contents of the mass storage device 440 into the main memory 435.

The portable storage medium device 446 operates in conjunction with a nonvolatile portable storage medium, such as, for example, a compact disc read only memory (CD-ROM), to input and output data and code to and from the computer 400. In some embodiments, the software for storing information may be stored on a portable storage medium, and may be inputted into the computer 400 via the portable storage medium device 446. The peripheral device(s) 442 may include any type of computer support device, such as, for example, an input/output (I/O) interface configured to add additional functionality to the computer 400. For example, the peripheral device(s) 442 may include a network interface card for interfacing the computer 400 with a network 439.

The input control device(s) 444 provide a portion of the user interface for a user of the computer 400. The input control device(s) 444 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 400 may include the graphics subsystem 448 and the output display 449. The output display 449 may include a cathode ray tube (CRT) display and/or a liquid crystal display (LCD). The graphics subsystem 448 receives textual and graphical information, and processes the information for output to the output display 449.

Each component of the computer 400 may represent a broad category of a computer component of a general and/or special purpose computer. Components of the computer 400 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to communicate between mobile devices and mobile wallet architectures, comprising:
    at least one memory; and
    a mobile wallet architecture processor coupled to the at least one memory, wherein the mobile wallet architecture provides transaction services and the processor executes application code instructions that are stored in the at least one memory to cause the system to:
        receive, by a mobile wallet architecture from a mobile device, a first request for communication, the first request including a first identifier associated with the mobile device;
        identify, by the mobile wallet architecture, from among a plurality of mobile network operator (MNO) systems, a first MNO system corresponding to the mobile device, using the first identifier;
        transmit, by the mobile wallet architecture, a second request to the first MNO system, the second request including the first identifier and requesting mobile device data necessary to continue communications between the mobile device and the mobile wallet architecture;
        receive, by the mobile wallet architecture, a response from the first MNO system, the response including the mobile device data necessary to continue communications between the mobile device and the mobile wallet architecture; and
        communicate, by the mobile wallet architecture, with the mobile device using the received mobile device data.

2. The system of claim 1, wherein the mobile device data includes a mobile device number.

3. The system of claim 1,
wherein the processor further executes application code instructions that are stored in the at least one memory to cause the system to associatively store the mobile device data and the first identifier in the mobile wallet architecture.

4. The system of claim 1, wherein the second request is transmitted by calling a service or function.

5. The system of claim 1, wherein the response is received over a secure network.

6. A computer-implemented method to communicate between mobile devices and mobile wallet architectures, comprising:
receiving, by a mobile wallet architecture from a mobile device, a first request for communication, the first request including a first identifier associated with the mobile device, wherein the mobile wallet architecture provides transaction services;
identifying, by the mobile wallet architecture, from among a plurality of mobile network operator (MNO) systems, a first MNO system corresponding to the mobile device, using the first identifier;
transmitting, by the mobile wallet architecture, a second request to the first MNO system, the second request including the first identifier and requesting mobile device data necessary to continue communications between the mobile device and the mobile wallet architecture;
receiving, by the mobile wallet architecture, a response from the first MNO system, the response including the mobile device data necessary to continue communications between the mobile device and the mobile wallet architecture; and
communicating, by the mobile wallet architecture, with the mobile device using the received mobile device data.

7. The method of claim 6, wherein the mobile device data includes a mobile device number.

8. The method of claim 6, further comprising associatively storing the mobile device data and the first identifier in the mobile wallet architecture.

9. The method of claim 6, wherein the second request is transmitted by calling a service or function.

10. The method of claim 6, wherein the response is received over a secure network.

11. A computer program product, comprising:
a non-transitory computer-readable medium having stored thereon sequences of instructions, which when executed by a computer, cause the computer to communicate between mobile devices and mobile wallet architectures, wherein each mobile wallet architecture provides transaction services to the mobile devices, the instructions comprising:
instructions to receive, by a mobile wallet architecture from a mobile device, a first request for communication, the first request including a first identifier associated with the mobile device;
instructions to identify, by the mobile wallet architecture, from among a plurality of mobile network operator (MNO) systems, a first MNO system corresponding to the mobile device, using the first identifier;
instructions to transmit, by the mobile wallet architecture, a second request to the first MNO system, the second request including the first identifier and requesting mobile device data necessary to continue communications between the mobile device and the mobile wallet architecture;
instructions to receive, by the mobile wallet architecture, a response from the first MNO system, the response including the mobile device data necessary to continue communications between the mobile device and the mobile wallet architecture; and
instructions to communicating, by the mobile wallet architecture, with the mobile device using the received mobile device data.

12. The computer program product of claim 11, wherein the mobile device data includes a mobile device number.

13. The computer-readable medium of claim 11, having stored thereon sequences of instructions, which when executed by a computer, cause the computer to associatively store the mobile device data and the first identifier in the mobile wallet architecture.

14. The computer program product of claim 11, wherein the second request is transmitted by calling a service or function.

15. The computer program product of claim 11, wherein the response is received over a secure network.

* * * * *